(12) United States Patent
Eberlein et al.

(10) Patent No.: US 12,462,050 B2
(45) Date of Patent: Nov. 4, 2025

(54) ROLE MANAGEMENT SYSTEM BASED ON AN INTEGRATED ROLE RECOMMENDATION ENGINE

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 292 days.

(21) Appl. No.: 17/979,423

(22) Filed: Nov. 2, 2022

(65) Prior Publication Data

US 2024/0143798 A1    May 2, 2024

(51) Int. Cl.
    *G06F 21/60*    (2013.01)

(52) U.S. Cl.
    CPC .... *G06F 21/604* (2013.01); *G06F 2221/2113* (2013.01); *G06F 2221/2141* (2013.01)

(58) Field of Classification Search
    CPC ........... G06F 21/604; G06F 2221/2113; G06F 2221/2141
    See application file for complete search history.

(56) References Cited

U.S. PATENT DOCUMENTS

| | | | | |
|---|---|---|---|---|
| 7,761,320 B2* | 7/2010 | Fliess | ..................... | G06Q 10/04 707/999.005 |
| 11,397,794 B1* | 7/2022 | Baghani | .................. | G06F 21/44 |
| 11,461,378 B1* | 10/2022 | Bhushan | ............... | G06F 16/248 |
| 11,516,299 B1* | 11/2022 | Amir-Siddiqi | ......... | G06N 20/00 |
| 11,640,470 B1* | 5/2023 | Amar | ................. | G06Q 10/0635 726/22 |
| 2005/0021383 A1* | 1/2005 | Fliess | ..................... | G06Q 10/04 705/7.14 |
| 2005/0138419 A1* | 6/2005 | Gupta | .................. | G06F 21/6218 707/999.009 |
| 2005/0138420 A1* | 6/2005 | Sampathkumar | ..... | G06F 21/604 726/4 |
| 2008/0295147 A1* | 11/2008 | Chang | .................... | H04L 63/102 726/1 |
| 2009/0320088 A1* | 12/2009 | Gill | ....................... | G06F 21/604 726/1 |
| 2011/0125678 A1* | 5/2011 | Partridge | ........... | G06Q 30/0631 706/54 |
| 2011/0314513 A1* | 12/2011 | Carter | .................... | G06F 21/604 726/4 |
| 2012/0246098 A1* | 9/2012 | Chari | ..................... | G06N 20/00 706/12 |

(Continued)

OTHER PUBLICATIONS

NPL Search History (Year: 2024).*

(Continued)

*Primary Examiner* — John B King
(74) *Attorney, Agent, or Firm* — Fish & Richardson P.C.

(57) ABSTRACT

In an implementation, a request to compute a new machine-learning model for storage in a data lake is received by a role management system (RMS). A role history data is read by the RMS from a role management application and trace history data from a trace application. Metadata read from a plurality of persistencies is stored into the data lake as metadata history. The historic data and metadata history is read by a role recommendation engine (RRE) integrated into the RMS. The RRE, computes the new machine-learning model.

20 Claims, 6 Drawing Sheets

(56) References Cited

U.S. PATENT DOCUMENTS

| | | | | |
|---|---|---|---|---|
| 2014/0122507 A1* | 5/2014 | Zeng | G06F 16/24575 | 707/749 |
| 2014/0188938 A1* | 7/2014 | Banks | G06F 16/20 | 707/783 |
| 2014/0196104 A1* | 7/2014 | Chari | H04L 63/102 | 726/1 |
| 2014/0359695 A1* | 12/2014 | Chari | G06F 21/604 | 726/1 |
| 2015/0026215 A1* | 1/2015 | Goel | G06F 21/604 | 707/784 |
| 2015/0180872 A1* | 6/2015 | Christner | H04L 63/10 | 726/4 |
| 2015/0334119 A1* | 11/2015 | Schmitt | H04W 12/084 | 726/3 |
| 2015/0339572 A1* | 11/2015 | Achin | G06N 20/00 | 706/46 |
| 2016/0041894 A1* | 2/2016 | Reid, III | G06F 11/3636 | 714/45 |
| 2016/0379001 A1* | 12/2016 | Eska | G06Q 30/016 | 726/4 |
| 2018/0060738 A1* | 3/2018 | Achin | G06N 20/00 | |
| 2018/0165367 A1* | 6/2018 | Schmidt | G06F 16/9535 | |
| 2018/0330331 A1* | 11/2018 | Nair | G06Q 10/1053 | |
| 2020/0076812 A1* | 3/2020 | Spurlock | G06N 20/00 | |
| 2020/0076819 A1* | 3/2020 | Spurlock | G06F 21/10 | |
| 2020/0082021 A1* | 3/2020 | Haze | G06Q 20/405 | |
| 2020/0082307 A1* | 3/2020 | Haze | G06N 5/022 | |
| 2020/0242536 A1* | 7/2020 | Schwantes | G06F 17/16 | |
| 2020/0274894 A1* | 8/2020 | Argoeti | H04L 63/1433 | |
| 2020/0358778 A1* | 11/2020 | Gopinathapai | G06F 21/604 | |
| 2021/0019146 A1* | 1/2021 | Kunamalla | G06Q 30/0202 | |
| 2021/0064984 A1* | 3/2021 | Wang | G06N 3/084 | |
| 2021/0065040 A1* | 3/2021 | Eberlein | G06F 9/451 | |
| 2021/0089860 A1* | 3/2021 | Heere | G06N 20/00 | |
| 2021/0117819 A1* | 4/2021 | Rao | G06F 16/904 | |
| 2021/0174305 A1* | 6/2021 | Schornack | H04L 63/102 | |
| 2021/0243190 A1* | 8/2021 | Bargury | G06F 21/6218 | |
| 2021/0314340 A1* | 10/2021 | Ubriani | G06F 21/316 | |
| 2022/0012363 A1* | 1/2022 | Colcord | G06F 16/211 | |
| 2022/0076164 A1* | 3/2022 | Conort | G06N 20/00 | |
| 2022/0200869 A1* | 6/2022 | Erlingsson | H04L 67/10 | |
| 2022/0368613 A1* | 11/2022 | Darji | G06F 9/5005 | |
| 2022/0368712 A1* | 11/2022 | Hen | H04L 41/22 | |
| 2023/0114226 A1* | 4/2023 | Gauldin | G06Q 10/063112 | 705/7.14 |
| 2023/0214370 A1* | 7/2023 | Michaelis | G06F 16/254 | |
| 2024/0080371 A1* | 3/2024 | Zunke | H04L 67/561 | |

OTHER PUBLICATIONS

Google.com [online], "AutoML Tables features and capabilities" May 12, 2020, retrieved on Oct. 25, 2022, retrieved from URL <https://cloud.google.com/automl-tables/docs/features>, 4 pages.

Microsoft.com [online], "What is automated machine learning (AutoML)?" Oct. 19, 2022, retrieved on Oct. 25, 2022, retrieved from URL <https://learn.microsoft.com/en-us/azure/machine-learning/concept-automated-ml>, 9 pages.

Wikipedia.org [online], "Separation of duties" created on Nov. 2005, retrieved on Oct. 25, 2022, retrieved from URL <https://en.wikipedia.org/wiki/Separation_of_duties>, 4 pages.

\* cited by examiner

ROLE MANAGEMENT SYSTEM BASED ON AN INTEGRATED ROLE RECOMMENDATION ENGINE

BACKGROUND

Modern software system security approaches (for example, "secure by default," "principal of minimal privilege," and "segregation of duties") limit access of individual users in a software system to a required minimum set of authorizations (and ideally not more) to execute required tasks. This leads to a situation where users require a large set of diverse roles which grant access to specific services, applications, functionality within applications, or data domains. Since users within entities (for example, government, enterprises, businesses, and organizations) typically run many different tasks and may also need to use "self-services," "development tools," and "analytics tools," the users will need many different roles. Users also typically access a heterogeneous set of solutions potentially provided by different vendors or even internally developed software tools as opposed to few systems or services.

SUMMARY

The present disclosure describes role and authorization management in a software system.

In an implementation, a request to compute a new machine-learning model for storage in a data lake is received by a role management system (RMS). A role history data is read by the RMS from a role management application and trace history data from a trace application. Metadata read from a plurality of persistencies is stored into the data lake as metadata history. The historic data and metadata history is read by a role recommendation engine (RRE) integrated into the RMS. The RRE, computes the new machine-learning model.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the described approach permits an entity to perform intelligent role management across software products of different vendors or deployments. Second, the approach is configured to analyze user profile data, authorization usage data, role definitions, and assignment data to derive insights and to support users, user administrators, and role administrators ("role designers") with recommendations to assist in making well-informed role decisions. Third, a rule-engine allows the user administrators to automate activities, generate recommendations based on data analysis by machine learning, and to enforce strict restrictions by post-processing machine learning results. Fourth, historic data can be used in a machine learning model to identify anomalies for proactive actions by the user administrators. Fifth, software change processes around authorization roles can be supported by proactively recommending actions to adapt existing role assignments. Sixth, collected holistic data can be used by the role administrator to derive tailored new roles or to optimize existing roles for certain user groups.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes role and authorization management in a software system, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Modern software system security approaches (for example, "secure by default," "principal of minimal privilege," and "segregation of duties") limit access of individual users in a software system to a required minimum set of authorizations (and ideally not more) to execute required tasks. This leads to a situation where users require a large set of diverse roles which grant access to specific services, applications, functionality within applications, or data domains. Since users within entities (for example, government, enterprises, businesses, and organizations) typically run many different tasks and may also need to use "self-services," "development tools," and "analytics tools," the users will need many different roles. Users also typically access a heterogeneous set of solutions potentially provided by different vendors or even internally developed software tools as opposed to few systems or services.

Authorization/role situations can also change over time. For example, 1) a user may need to perform a new task, has changed duties, or moved into another position or area within an entity or 2) software changes occur (such as, new software is introduced or a new software version is deployed that adds new functionality protected by new privileges and roles). Typically, a user then has to request additional permissions to obtain access to systems or data in order to perform the new task (or an existing task in a new/changed system).

Even if there is already one central system/entry point to request authorizations, this process can be quite cumbersome for a user. Questions asked may include: 1) which role is required and needs to be asked for? or 2) who should be asked to have a new role(s) granted?

For user administrators or other authorized colleagues empowered to grant access or design roles, questions arise, such as: 1) which role should I grant, is there a "better fitting" role for the user?; 2) can I give this role to the user asking for the permission?; 3) would this person have too many permissions (in the sense of "segregation of duties") if I grant the role?; 4) did other users with a similar profile obtain the permission? If so, by assigning which role? and 5) is this a misuse of the system by the user to obtain unintended access, a mistake, or a misunderstanding?

In some situations, the impact of a cumbersome and manual authorization process can be: 1) an excessive amount of time spent by users and administrators under an inefficient process which results in unnecessary costs related to lost time, computing resources, and potential software system security issues and 2) time delay for a user to be able to perform a new task if it takes multiple iterations of an inefficient process for the user to identify what permission/role to ask for and to find a best responsible administrator (both privileged and also currently available in the sense of not out-of-office).

The described approach is related to authorization management in entities running a software system with a large set of software products, many users, and administrators managing authorizations for the software products. In the context of this disclosure, authorization is meant as a permission to access, among other things, a certain software-as-a-service (SaaS) product, application, functionality within an application, software development tools, data domains, repositories of software, deployed-landscapes, or infrastructure-as-a-service (IaaS) provider accounts.

A described software system supports both users and administrators in authorization role management processes. Provided are insights into role usage and recommendations for role requests and assignments generated by a role recommendation engine and based on a combination of machine learning models with a rule system.

Data on historic user-role assignments is used and enriched with organizational information about the users as well as data regarding the processes used, which are the target of the role assignments. The developed role assignments create a holistic dataset that can be used for providing recommendations to users or administrators related to authorization roles that should be requested or granted, based on a user's profile compared to the acquired knowledge and validated by rules implementing hard restrictions to comply with company or even legal regulations.

Figure 1:
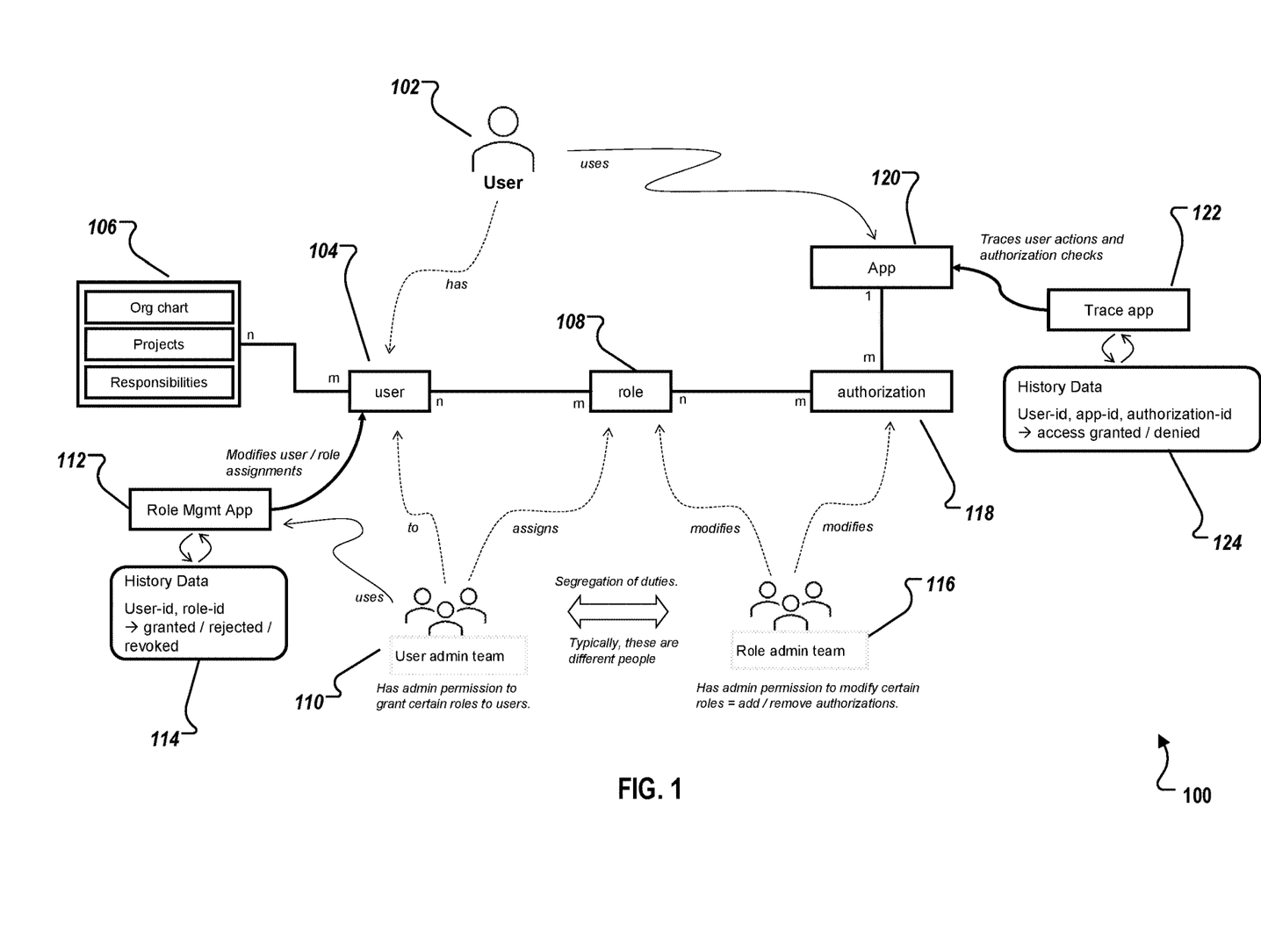
FIG. 1 is a block diagram illustrating an overview of data domains and users in a software system, according to an implementation of the present disclosure.

FIG. 1 is a block diagram 100 illustrating an overview of data domains and users in a software system, according to an implementation of the present disclosure.

As shown in FIG. 1, a user 102 has an associated data object 104 associated with, among other things, an organization chart, projects, and responsibilities 106 and role(s) 108. A user administrator of a user administrator team 110 is responsible for granting roles to users using the role management application 112. The role management application 112 is coupled with history data 112 related to roles (for example, user-id, role-id resulted in granted/rejected/revoked data). On the other hand, a role administrator of a role administrator team 116 has permissions to define/modify roles 108 and to add/remove authorizations 118 associated with roles. The role administrator 116 reads the data and optimizes the assignment for future use of the new roles by the user administrator team 110. Note that in typical implementations, the user administrator team 110 and role administrator team 116 are made up of different individuals and have a defined segregation of duties.

The user 102 uses application 120 functionality consistent with limits specified by authorizations 118. In some implementations, a trace application 122 can also be used to trace actions and authorization checks associated with user 102 use of the application 120. The trace application 122 can be coupled with history data 124 associated with user 102 use of the application 120 (for example, user-id, app-id, authorization-id resulted in access granted/denied).

The n–m indicated on the lines between the boxes in FIG. 1 (for example, with user 104 and role 108, user_n–m_role) indicates that, n users can have a certain role, and a user can have m roles. Note that in some implementations, there is no 1:1 mapping.

In software systems, there are typically many fine-grained roles, each tailored for certain use cases, and no "grant-all authorization"-type roles. To execute one task may require running a process spanning multiple systems, so a user may require several authorizations in several systems. However, the authorizations may be associated (along with other authorizations) with several roles. The question is, for a process and specific user in a position within an entity, which set of roles are required and which roles are most appropriate in the sense that they cover needed authorizations but do not grant other unnecessary authorizations? Also, is there a typically assigned set of roles granting a "typical set of authorizations" that many other users possess in a similar setup?

Software systems can also change, which changes functionality and associated roles. When a productively used software system is changed, users may need additional or different roles to complete similar tasks they could successfully complete prior to the change. Reasons can include extended functionality (for example, a new service is called in a process) or that a role model has changed (for example, to adjust to new security considerations to minimize authorizations to actual use and have more constrained (less broad) roles).

It is not always known centrally, which users run which processes. This is because a used software system landscape may be heterogeneous and distributed (for example, for a development process, deployment to production landscapes, and for user self-service offerings or analytics).

User participation in new tasks, projects, responsibilities, and focus area may also require new roles. For example, execution of new tasks or a need to analyze additional data for a new task raises questions such as which roles are needed for the user and which are ideal roles for the specific user if there is more than one role to choose from?

Delivering a set of ready-to-use processes including associated required roles is difficult to create for a software vendor. There can be many possible variations in software configuration, and desired individualizations or specific extensions by an entity cannot be foreseen by a software vendor. To design and derive roles for heterogeneous processes spanning different software products from a process section, scoping, or Q&A tool is very time and resource intensive.

Processes spanning different software products of different vendors that need to be combined individually for a specific situation require configuration consuming entities. For example, entities typically use processes spanning SaaS solutions, deployed products, and entity owned tools and services. Authorization management in such processes cannot be efficiency/effectively handled with one single role, but requires a role(s) in differing systems; therefore multiple roles typically need to be assigned in combination.

In many cases, users collect roles over time and potentially acquire unnecessary access rights. Granted roles are often configured to expire after a certain period of time to prevent users from accumulating more and more roles over time that are no longer needed. This results in a process where users are repeatedly informed that their role will expire, but if it is still needed ask for a renewal of the role. Users often do not know which role(s) are required for which task, so users tend to request renew of all roles, even if unknowingly not needed. This situation can result into self-service-renewal to avoid administrative efforts and minimize effort/costs. So, over time, roles granted to a user are not optimized to what the user actually needs. This can introduce role/authorization inefficiencies, security issues, and undesired task performance/overlap.

The described approach provides a role management system (RMS) based on an integrated role recommendation engine (RRE), which supports users and user administrators with requests for and granting of roles and also provides insights to role-designers role administrators. The described RMS includes user interface (UI) dashboard functionality with provided tailored data insights, a rule-definition environment, and the RRE, which uses defined rules and machine learning (ML) models to create recommendations. The RMS assists with reducing workload for user administrators, optimizes roles/authorizations granted to users, and permits at least partial automation of the role/authorization analysis and granting processes. The RMS and RRE support proactive and reactive processes, post-processing capabilities to filter results, and delivering data insights for role designers to optimize roles for future use.

With respect to proactive processes, the RRE proposes to a user administrator which roles to grant in the context of an automated process triggered by some change to a user or software, such as an entity change/promotion/project assignment (refer to 106 in FIG. 1) or a software update. The RRE can propose to a user administrator which roles to revoke or to change in the context of an automated process. The RRE can also propose to a user which roles to request, based on what the user intended to access in combination with the user's profile compared to roles of similarly situated users.

With respect to reactive processes, when a user is in an authorization request UI, RRE can recommend which role to request and which user administrator to send the request to. When an administrator receives a request from a user for granting a specific role, the RMS can provide context information on the requestor, typical role assignments of the profile, and statistics on an associated team and entity the user is part of. When an administrator receives a request for granting a specific role, the RRE can provide a recommendation to grant or not to grant the role based on rules defined by administrators and based on a ML model trained on history data.

With respect to filtering of approvers, when a set of administrators are identified that can address a request, the RMS provides a filtering mechanism based on additional data from integrated systems. For example, administrator availability can be filtered (for example, which administrators are immediately available and remove/annotate administrators who are absent) or an identified administrator no longer has a role/rights to act on a request (for example, the prior administrator moved to another entity or has other responsibilities).

With respect to filtering of roles, when approving a request for a specific role (which can be suggested by a ML engine based on roles assigned to other users with similar profiles), but granting the requested role would violate segregation of duties restrictions due to other roles already assigned to the user, then, in some implementations, the rule defined by a user administrator to ensure segregation of duties would overrules the recommendation. When compiling a list (which, in some cases, can be ranked) of suggested roles to be assigned to a user, suggested roles that would violate segregation of duties restrictions can be removed/filtered from a recommendation list.

With respect to role tailoring, based on data associated with rules being granted/rejected, use of roles and authorizations, and related organizational data, insights on role and authorization usage, role-authorization assignment, user groups, and time spans of use can be provided to role designers. In this way, role designers can, for example, optimize role-collections, role-authorizations assignments, and definitions of expiration times. Data analysis processes can identify unused authorizations in roles being granted to certain user groups. Therefore, a role designer can infer to create another role with a more suitable authorization assignment and trigger a process to change the role assignment for affected users, or to simply remove certain authorizations from a role if none of the assigned users actually require them. Data analysis can infer clusters of roles that are assigned in combination for user groups. Therefore, a role administrator can create a role-collection to simplify user administrative effort in the future. Also, by analyzing durations for which users perform tasks enabled by a certain role, roles that are only needed temporarily can be identified and associated with a recommended validity period. User administrators can then assign roles with a recommended expiration date, which is sufficient for performing required tasks. An example would be access to a customer's records during a support case. The access rights should be revoked following a typical maximum processing time. As expirations are only used exceptionally for those roles where it makes sense, no renewal process needs to be implemented, which comes with the downsides as described above (that user "defensively" simply renew everything).

Figure 2:
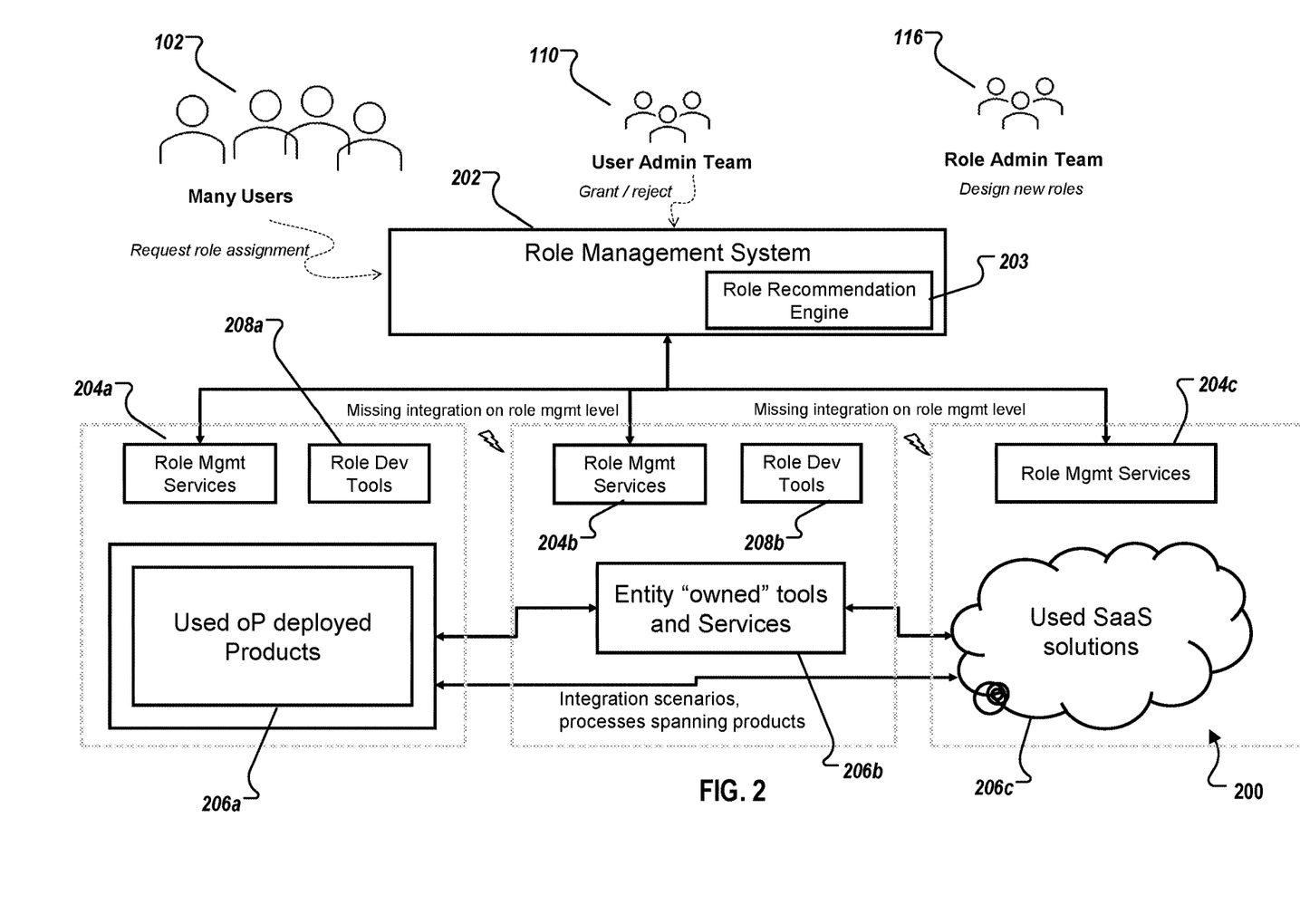
FIG. 2 is a block diagram illustrating a role management system (RMS) and role recommendation engine (RRE) integrated with role management services and role development tools of different software products and services used in a software system landscape, according to an implementation of the present disclosure.

FIG. 2 is a block diagram 200 illustrating a role management system (RMS) and role recommendation engine (RRE) integrated with role management services and role development tools of different software products and services used in a software system landscape, according to an implementation of the present disclosure.

The RMS 202 with RRE 203 is integrated with role management services 204a, 204b, and 204c of different products and services used in the customer landscape, and potentially to customer-created tools and their authorization management infrastructures. For example, FIG. 2 illustrates products and services deployed "on premise" 206a, entity owned tools and services 206b, and used SaaS solutions 206c, which expose role management services 204a, 204b, and 204c, respectively. Also illustrated are corresponding role development tools 208a and 208b, respectively, which allow defining new roles. In this way, roles can be assigned and revoked. In some implementations, the data on user-role assignments can be stored in a histories format (for example, see 114 and 124 in FIG. 1) for later analysis. Note that used SaaS solutions 206c is not illustrated as having role management service or role development tools. SaaS solutions typically offer a set of roles that a consumer that choose from, and not a development environment to create custom roles. This enables adjusting roles and authorizations to new versions of a SaaS product and consumers do not need to react following a SaaS product upgrade. Having role development associated with SaaS services could lead to an attempted adjustment effort. So typically this is avoided.

The RMS 202 provides an application programming interface (API) (not illustrated) used to request a role or role-collection for a certain user or user group. The API can be integrated into a UI so users can directly ask for permission in a UI they call.

The RMS 202 can also provide a UI for role administrators (for example, from the role administrator team 116) to view a queue of incoming requests and is configured with functionality to grant/reject role assignments and execute an assignment in the respective products or SaaS solutions (here, 206a, 206b, or 206c).

To support administrators (here, the user administrator team 110 and the role administrator team 116), the RMS 202 can annotate each request with information regarding a user 102 (entity), a role-use (statistical), and roles a user already possesses, including historic information of what had been previously assigned/revoked.

Figure 3:
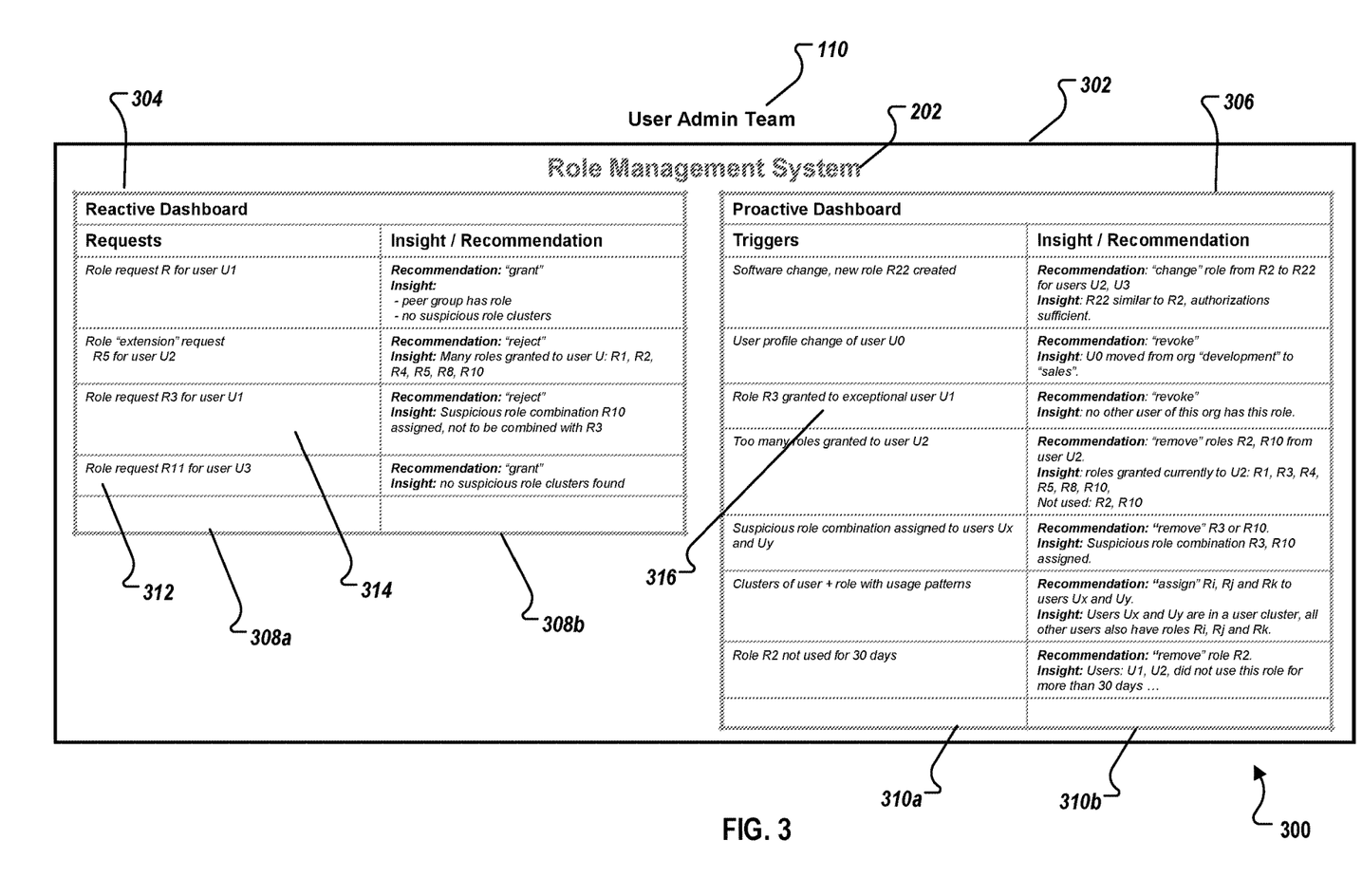
FIG. 3 is a block diagram illustrating both reactive and proactive dashboards presented by the RMS in a dashboard user-interface (UI) to a user administrator team, according to an implementation of the present disclosure.

FIG. 3 is a block diagram 300 illustrating both reactive and proactive dashboards presented by the RMS 202 in a dashboard UI to a user administrator team, according to an implementation of the present disclosure.

In response to a query of whether to assign or reject a particular role request from a user, an administrator of the user administrator team 110 can call a dashboard UI 302. The dashboard UI 302 includes panels for a reactive dashboard 304 and a proactive dashboard 306. The reactive dashboard 304 has a list of requests and insight/recommendation (308a and 308b) and the proactive dashboard 306 has a list of triggers and insight/recommendation (310a and 310b, respectively).

As an example, on the reactive dashboard at 312, user U3 has requested assignment of role R11. The RMS 202 recommendation is to "grant" as provided insight states that "no suspicious role clusters found." However, at 312, where user U1 request assignment to role R3, the RMS 202 recommendation is to "deny" as provided insight states that a "Suspicious role combination R10 assigned, not to be combined with R3." The provided insight is very useful to provide an administrator of a user administrator team 110 a reason for a grant/deny. This reason can be further investigated and changed made if needed.

As another example, on the proactive dashboard at 316, assume that the recommendation/insight at 314 was ignored and user U1 was granted assignment to Role R3. The RMS 202 can provide a proactive insight/recommendation 310b recommendation of "revoke" and insight "no other user of this org has this role" in response to the trigger 310a that "Role R3 granted to exceptional user U1." In this way, the system provides proactive recommendations/insight to the user administrator team 110 to increase efficiency and avoid always being in a reactive mode. One benefit of this is that potential security issues can be proactively corrected to prevent system damage/abuse and a subsequent reactive response to correct and address any damage/abuse of the system.

Figure 4:
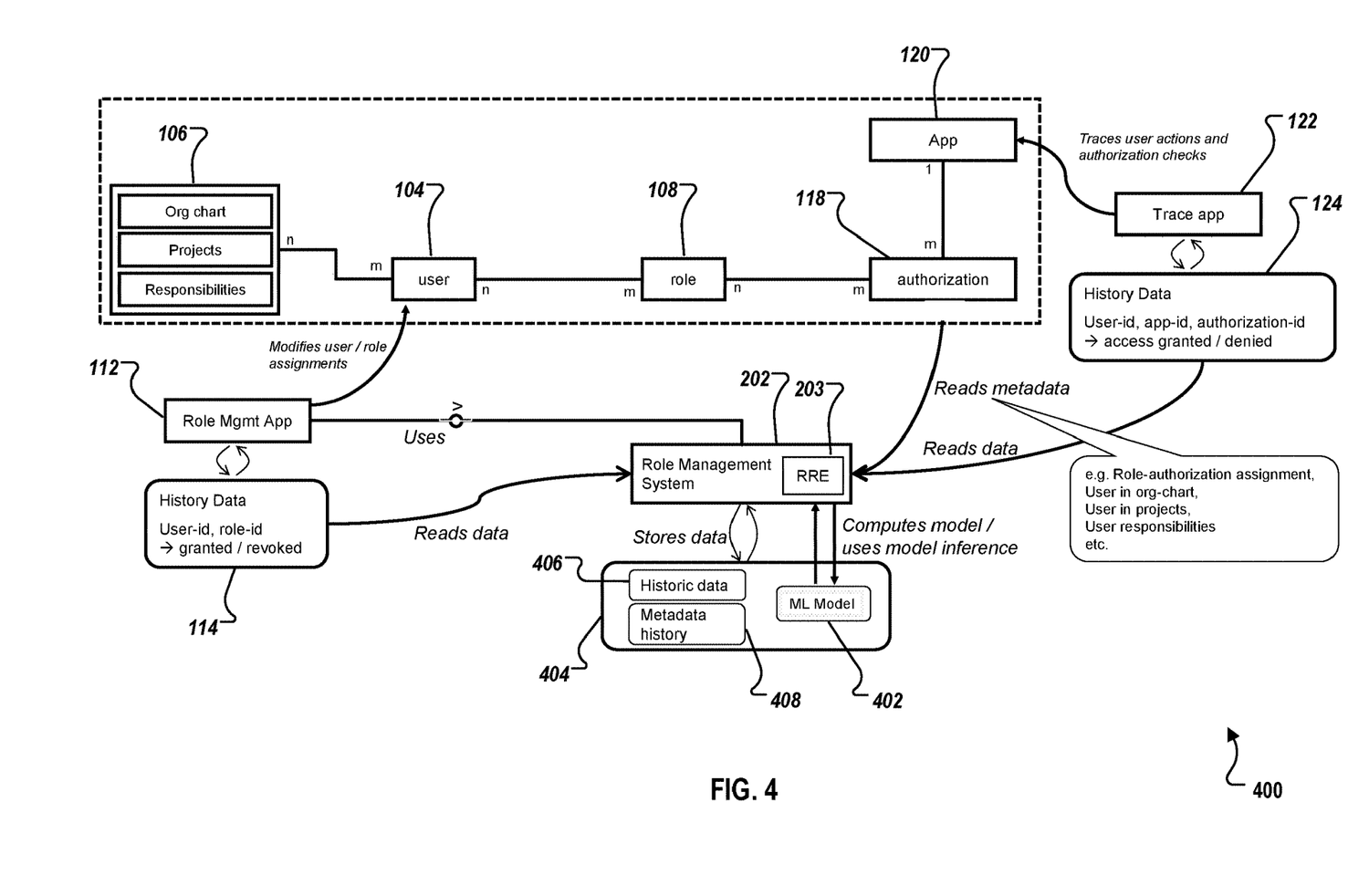
FIG. 4 is a block diagram illustrating an RMS system based on an integrated RRE, according to an implementation of the present disclosure.

FIG. 4 is a block diagram 400 illustrating an RMS system based on an integrated RRE, according to an implementation of the present disclosure.

The role management system (RMS) 202 is triggered by a request to compute a new ML model 402 stored in a data lake 404.

The RMS 202 reads history data 114 from the role management application 112, and history data 124 from the trace application 122.

The RMS 202 then stores the history data locally at 406 in the data lake 404.

The RMS 202 also reads metadata 104, 106, 108, and 118 from the application 120 and other persistencies storing data 106 and stores a copy of the metadata at metadata history 408.

The RRE 203 then reads historic data 406 and metadata history 408.

The RRE 203 computes the ML model 402.

As an example, the user 104 can request a new role 108 using role management application 112 (refer to 502 in FIG. 5) (for example, because the user had accessed the application 120 and received an "access denied").

The request for a new role 108 is forwarded to the RMS 202.

The RMS 202 calls the RRE module 203, which access the ML model 402 to compute, which role is suitable for the application 120 and this request, and a recommendation, if the role should be assigned to the user or not.

The RRE 203 computes a user administrator 110 the request is sent to.

The administrator 110 then receives a request to assign a role to a user by the RMS 202, views the recommendation and role insight given by 203, and then assigns the role in the role management application 112 (or rejects the request). In some implementations, the result of this action is stored in the data lake 404 with a reference to the user 104 requesting role 108 (for example, see following Table 1, "label data" column "status"). The historic metadata then can provide the remaining data (for example, the authorizations 118, which had been part of role 108 at that time) and (the organizational data 106 of the user 104 at that time).

The RMS 202 is configured for data-retrieval (for example, pull or push) to collect data from the used products and services (for example, 206a, 206b, and 206c of FIG. 2) on usage by users 102 and used authorizations/access rejections due to missing roles. Data is stored in a histories format (for example, historic data 406), which can be analyzed at a later point-in-time. Note that historic data 406 is a copy of history data 114 and history data 124 to be used for the ML process by the RRE 203. The metadata history 408 is a copy of the data within the dashed box in FIG. 4 (for example, 104, 106, 108, 118, and 120) stored with a timestamp. The data at 104-120 will change over time, so data lake 404 is used to keep copies of the older values.

The RMS 202 is configured with data integration with systems in user organization management (for example, organization chart, seniority, and teams 106) and stores this data in a historized format in the data lake 404 for building a profile that can be used in later analysis.

The stored data can be used to run analytics, anomaly detection, and data clustering to supply the RRE 203. A ML infrastructure (part of RRE 203) can be used to find optimal algorithms and store these as ML model 402.

With respect to analytics, in some implementations: 1) roles assigned to user can be listed and respective authorizations of the roles that have not been used for a defined period in time (for example, 3 months); 2) list authorizations part of roles assigned to users, which have the lowest usage rate (for example, only been used in 1% of the cases); and 3) list authorizations used with a highest frequency and related roles and users—exclude "technical users".

With respect to clustering: 1) compute clusters of authorizations (and roles assigned to) for usage in short time interval/compute time-clusters of usage and 2) compute clusters of users and roles being assigned.

With respect to anomaly detection: 1) detect role-combinations assigned to only a very small number of users and 2) user administrators 110 can tag roles with attributes and then search for a rare combination of tags (for example, "creator" and "approver").

In some implementations, the RRE can provide recommendations on incoming requests (to grant or reject). The recommendations can be based on ML models and rules defined by the user administrators. This combination provides a benefit that "hard" rules can ensure compliance, while, for less critical aspects, ML algorithms can provide better and more up-to-date suggestions based on regular training.

The RMS 202 is configured with a "rule definition environment," (not illustrated) which can permit user administrators to define rules. The rules are executed upon incoming requests, and a result is visualized together with the request(s) (for example, a rule can be that two roles exclude each other and that a user who has role R1 must not have simultaneously assigned role R2).

In some implementations, rules can be specified to run automatically, and only results are logged. For example, auto-approve certain roles for certain user groups and reject role requests in case an exclusion rule applies.

Rules can also be specified to run as a recommendation, where results are provided to the user administrators for approval. For example: 1) expiration of roles if a user changes to a different entity. Here users are sent an expiration notification and can ask for renewal. The user administrators can decide again on the new situation; 2) expiration of roles is not used for a certain period in time (and not sending a renewal request reminder); and 3) particular roles can be defined as only applicable to executive or other class of users.

With respect to data insights (for example, analytics, clustering, and anomalies), data insights can be provided to role designers (for example, members of the role administrator team 116 in FIGS. 1 and 2). In some implementations, role designers can run additional data analysis to gather insights in role usage and misuse patterns and can derive role-design based on actual usage data. The application 120 has an associated trace application 122, which reads activities run by the user 102 in the application 120. The trace application 122 stores in the history data 124, which authorizations 118 a user 102 used when using the application 120. These authorizations can be a subset of authorizations that are part of role 108. For this kind of use of application 120, a role with less authorizations would be sufficient, therefore a role administrator team 116 could decide to define a new role 108 with less authorizations assigned. Typically, the data model is: one user 104 can have several (one or more) roles 108 assigned, which comprise several (one or more) authorizations 118. The application 120 uses several (one or more) authorizations to check, if the user 102, who is assigned the technical entity user 104, has permission to run a desired action on the application 120.

The RRE 203 of the RMS 202 bases recommendations on insights obtained from analyzing historic data 406. As previously described, historic data 406 is collected in a data lake 404 (for example, a relational database, graph database, text files, and/or other storage) and stored in historized format. In some implementations, the historic data 406 can include, but is not limited to, data on role assignment/rejection to users 102, entity data regarding the users 102 (for example 106, 114, and 124 of FIG. 4), and data from the system landscape on application use, authorization use, and time-of-access statistics. In some implementations, data on earlier role assignment/rejection can be used as "label data."

Table 1 is an example of a possible implementation of data storage in data lake 404. The data is essential to computer the ML model 402 and provide a later recommendation. For example, column "user" can relate to 104; column "role" to 108; column "auth" to 118; and columns Level, Seniority, Org, and Region can relate to 106. Column "Status" relates to a decision by a user administrator team 110 at that time. As an example, role 100012 was assigned to user 901 (in this case YES) or role 100013 was not assigned to 902 (in this case NO).

TABLE 1

| User | Role | Auth | Level | Seniority | Org | Region | Status |
|---|---|---|---|---|---|---|---|
| 901 | 100012 | 90025 | L3 | T3 | Sales ME1 | ME | Granted |
| 901 | 100013 | 90023 | L3 | T3 | Sales ME1 | ME | Granted |
| 902 | 100013 | 90023 | L5 | T1 | Sales US2 | US | Rejected/revoked |
| 902 | 100014 | 90024 | L5 | T1 | Sales US2 | US | Granted |
| 902 | 200101 | 80203 | L5 | T1 | Sales US2 | US | Granted |
| 903 | 100013 | 90023 | L2 | T5 | Sales E | EMEA | Granted |
| 904 | 100013 | 90023 | L2 | T5 | Sales A | Americas | Rejected/revoked |

A request is then described for the RRE 203 together with the data also represented in the data history used to compute a recommendation. Table 2 represents a data record R used for an inference call to RRE 203:

TABLE 2

| User | Role | Auth | Level | Seniority | Org | Region |
|---|---|---|---|---|---|---|
| 909 | 100013 | 90023 | L2 | T4 | Sales ME2 | ME |

The request is passed to the ML model 402, which has been trained with data from Table 1. The ML model 402 computes a "grant" or "reject" based on information extracted from the status of Table 1.

In some implementations, historic data on role assignment to users or role definition data includes a role-id, assignments of authorizations to roles, including authorization-id, and the assignment of roles to users or user groups, including user-id/group-id.

In some implementations, organizational data regarding the user (for example 106 in FIG. 4) can vary depending on entity organization and roles (for example, matrix or hierarchical and is there a functional career path or project management path). Types of organization data can include, but is not limited to:

Organizational chart, organization the user is in, peers of the user, manager of the user: this data permits identification of a team/peers of user, and typically people in similar teams have similar tasks to perform along with similar rights to obtain authorizations.

Manager information: if the user is a manager managing teams (MMT), manager managing managers (MMM), or manager managing organizations (MMO): managers at a higher hierarchical level are typically more privileged and can obtain access to broader roles with more authorizations.

Hierarchy of the user: for example, L0 (board member), L1 (reporting to board member/L0), or L2 (reporting to L1). This is important, as users higher in a hierarchy are typically more privileged and can get access to broader roles with more authorizations.

Seniority/T-Level of the user: for example, T1 (entry level) . . . T5 (chief level). This is important as more senior users are typically more privileged and can get access to broader roles with more authorizations.

Other systems, which can be accessed depending on entity organization: 1) project management systems (projects the user works on)—if other users from this project have the permission, the new users should likely obtain it as well; 2) support systems—customers, the users work with, customer regions, customers using certain products; 3) sales systems—the user is typically responsible for a certain region (for example, US, Americas, DACH (Germany, Austria, Switzerland), or Asia pacific); 4) job profile—engineers typically require different permissions compared to salespeople, marketing department, and HR generalists.

In some implementations, the previously described set of data domains is used to assess, if other users with a similar profile, have/do not have roles the user is asking for and how they compare to the user: 1) for example, if a user is compared to another to assess if access rights should be given and the one is an L1 and the other an L5, this information needs to enter the recommendation; 2) if the user is in database support, the user needs different roles than if working in customer relationship management; 3) if the one user is working in US sales and the other in Asia Pacific sales, they might not necessarily require the same roles, whereas if they both work for the US market, they likely require the same/similar roles.

Data regarding the system landscape, business application and use of the services by users include:

1) Business process(es) used by the user (if available in a digital form). If a user starts using a new process (and there is no mechanism to grant all required roles for this process as an entity, for example, because the process spans multiple systems with separate role managements), the user will start asking for roles along the progression of the process, each time the user stumbles upon a new authorization issue. A business process can be a grouping information for several roles/authorizations required to run the process end-to-end. Business process(es) can be derived, because other users running the process have these roles—a new user asks for the first role and the next roles can be granted proactively to speed up the process. The RRE 203 acts as if "there was a mechanism to grant all required roles for this process as an entity".

2) Applications used by the user. Even if not integrated or grouped into a process, the applications may relate and similar users need to use a similar set of applications; and 3) A person having an entity supplied car needs access for an application to check a driver license, the application showing the car status and the application managing costs for fuel or repair.

Application metadata/landscape data on dependencies of the application/deployment blueprint data. An application might be composed of several services, be integrated with other applications, or call backend services. Needing access to an application may require access also to a set of other services or applications.

Portal pages/entry pages can be accessed by many roles, but a determination is made as to which role is most relevant for which user group. A portal might organize access to many services and the services in many usage patterns. For certain user groups the roles to be granted are group-specific. When the group is identified as such, recommendations can be based on group membership.

Figure 5:
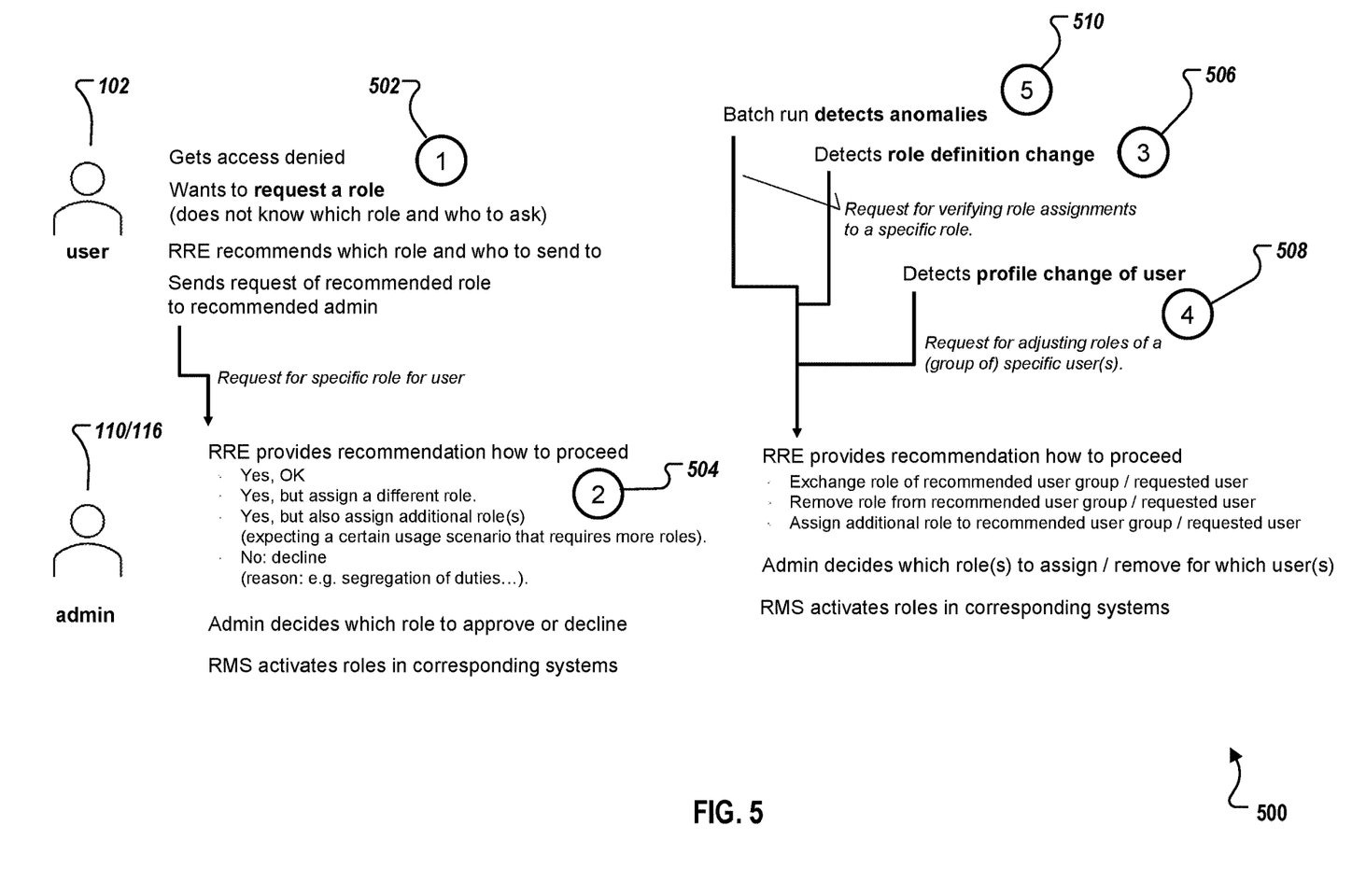
FIG. 5 is a flowchart illustrating an example of a computer-implemented method for role and authorization management in a software system, according to an implementation of the present disclosure.

FIG. 5 is a flowchart illustrating an example of a computer-implemented method 500 for role and authorization management in a software system, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

Example processes and methodology for scenarios associated with role and authorization management in a software system are provided. The processes can be run in sequence, individually, or in various combinations.

At 502(1), a user 102 receives an access denied on a UI for a software product and requests a role to obtain access. The RRE 203 generates a recommendation for the user: 1) the role(s) to ask for (fitting current need and expected follow-up needs); 2) an administrator (for example, from the user administrator team 110) to ask (filtered to be available and having processed similar requests), and 3) the user 102 then generates a role request for a specified role.

At 504(2), a user administrator 110 receives the role request from the user 102 and needs to decide how to handle the request. Note that the incoming role request could have been supported by the RRE 203 suggesting a role, or a known role is explicitly requested by the user 102. Additional checks are still executed and the user administrator 110 is provided a recommendation (such as, such as described with respect to FIG. 3).

In some implementations, the request may have come from another channel, without a concrete role request, but providing context for what purpose appropriate roles should be assigned. In this case the RRE 203 can recommend a role(s) to assign to the user 102. For example, a newly hired person should be assigned a particular role(s).

In typical implementations, recommendations can be 1) YES/OK; 2) YES, but assign a different role; 3) YES, but also assign additional role(s) (expecting a certain usage scenario that requires more roles); or 4) NO, decline (reason: for example, segregation of duties . . . ).

At 506, a reaction occurs base on a changed software system environment. For example, a role definition changed or a role similar to an existing role is created to sharpen contained authorizations. A mass change for all users assigned the role is triggered. Where a more restrictive role is provided, a recommendation can be to determine the set of users who only used the list of authorizations of the new role. If one group did not use an authorization, which had been part of the old role but not of the new, this results in revoking the old role and assigning the new role and keeping their usage scenarios intact/limiting authorizations to the needed subset. If another group of users need to keep their existing role, a no change recommendation would be generated.

At 508, a reaction on a change of user profile occurs. For example, if a user 102 moves to another entity, was assigned to a new project, or was promoted, a recommendation is triggered. In some implementations, the recommendation can be to: 1) assign an additional role(s) (for example, promotion to manager) or 2) revoke roles (for example, when the user 102 is no longer working in a sales team and no longer needs access to respective sales team data).

At 510, a batch run of RRE 203 data analysis can provide insights for proactive actions of user administrators 110. For example, identified anomalies can be listed, and user administrators 110 can assess the situation and then tag the identified anomalies as "yes, critical" or "no, not critical" and run a manual follow-up for the identified anomalies. In some implementations, anomaly detection can be improved in later runs based on tags provided by the user administrators 110.

In some implementations (not illustrated in FIG. 5), an additional scenario can include an authorization trace, which tracks performed authorization requests of a user 102 to determine required or missing authorization objects. This can be used to learn: 1) which authorization checks are actually performed while users operate within their usage scope of an application and to recommend that unused permissions should be removed from a role and 2) which authorization checks failed and triggered users to request additional permissions. The data on failed authorization checks can be used by the role administrator team 116 to either extend primary roles to avoid other users requesting additional roles or, if all users to not require the extended permissions, to make recommendations about which role is best suited (as it covers the missing authorizations) for those users that do require the additional permissions.

Figure 6:
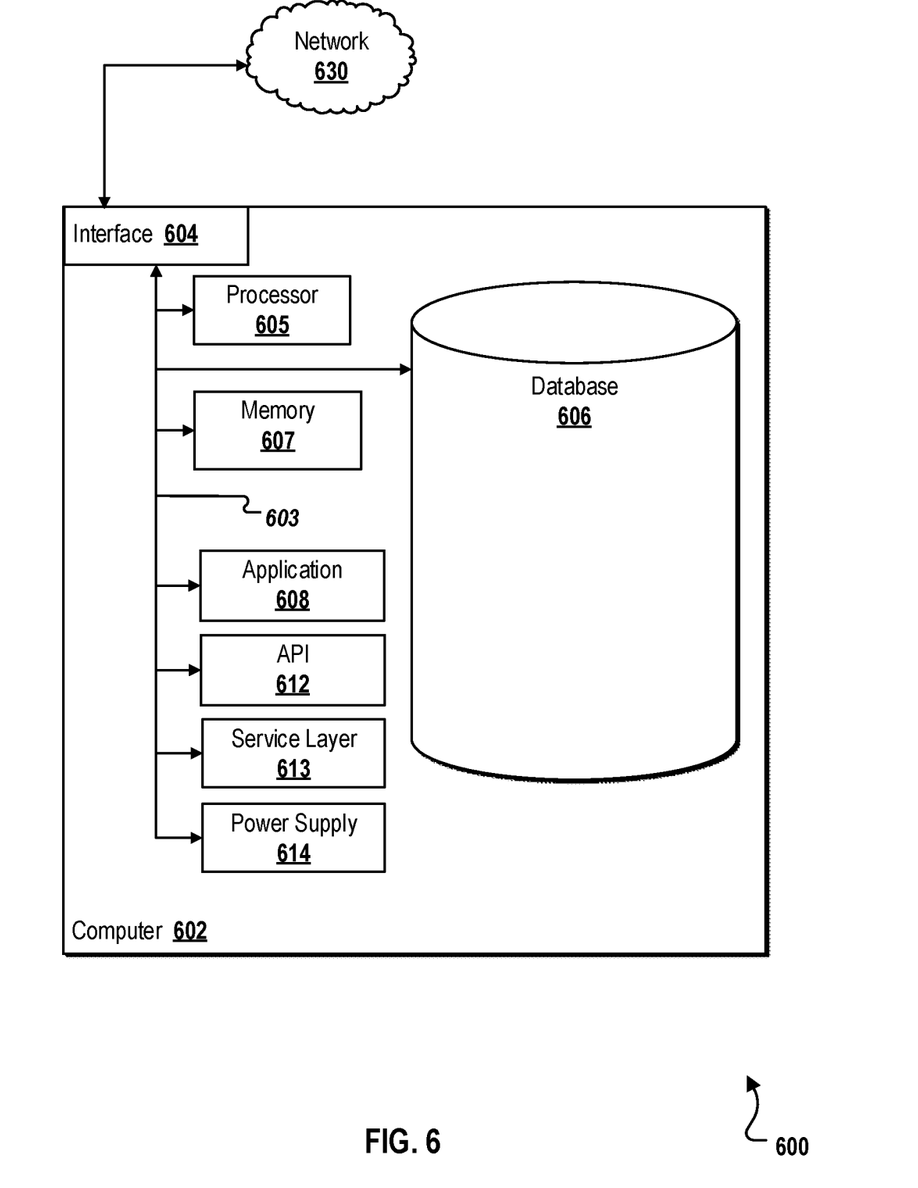
FIG. 6 is a block diagram illustrating an example of a computer-implemented system used to provide computational functionalities associated with described algorithms, methods, functions, processes, flows, and procedures, according to an implementation of the present disclosure.

FIG. 6 is a block diagram illustrating an example of a computer-implemented System 600 used to provide computational functionalities associated with described algorithms, methods, functions, processes, flows, and procedures, according to an implementation of the present disclosure. In the illustrated implementation, System 600 includes a Computer 602 and a Network 630.

The illustrated Computer 602 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 602 can include an input device, such as a keypad, keyboard, or touch screen, or a combination of input devices that can accept user information, and an output device that conveys information associated with the operation of the Computer 602, including digital data, visual, audio, another type of information, or a combination of types of information, on a graphical-type user interface (UI) (or GUI) or other UI.

The Computer 602 can serve in a role in a distributed computing system as, for example, a client, network component, a server, or a database or another persistency, or a combination of roles for performing the subject matter described in the present disclosure. The illustrated Computer 602 is communicably coupled with a Network 630. In some implementations, one or more components of the Computer 602 can be configured to operate within an environment, or a combination of environments, including cloud-computing, local, or global.

At a high level, the Computer 602 is an electronic computing device operable to receive, transmit, process, store, or manage data and information associated with the described subject matter. According to some implementations, the Computer 602 can also include or be communicably coupled with a server, such as an application server, e-mail server, web server, caching server, or streaming data server, or a combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or even a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory or conventional database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602. As illustrated, the Database 606 can hold previously described data applicable to the described approach.

The Computer 602 also includes a Memory 607 that can hold data for the Computer 602, another component or components communicatively linked to the Network 630 (whether illustrated or not), or a combination of the Computer 602 and another component. Memory 607 can store any data consistent with the present disclosure. In some implementations, Memory 607 can be a combination of two or more different types of memory (for example, a combination of semiconductor and magnetic storage) according to particular needs, desires, or particular implementations of the Computer 602 and the described functionality. Although illustrated as a single Memory 607, two or more Memories 607 or similar or differing types can be used according to particular needs, desires, or particular implementations of the Computer 602 and the described functionality. While Memory 607 is illustrated as an integral component of the Computer 602, in alternative implementations, Memory 607 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 608 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or non-rechargeable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or recharge a rechargeable battery.

There can be any number of Computers 602 associated with, or external to, a computer system containing Computer 602, each Computer 602 communicating over Network 630. Further, the term "client," "user," or other appropriate terminology can be used interchangeably, as appropriate, without departing from the scope of the present disclosure. Moreover, the present disclosure contemplates that many users can use one Computer 602, or that one user can use multiple computers 602.

Described implementations of the subject matter can include one or more features, alone or in combination.

For example, in a first implementation, a computer-implemented method, comprising: receiving, by a role management system (RMS), a request to compute a new machine-learning model for storage in a data lake; reading, by the RMS, role history data from a role management application and trace history data from a trace application; storing metadata read from a plurality of persistencies into the data lake as metadata history; reading, by a role recommendation engine (RRE) integrated into the RMS, historic data and metadata history; and computing, by the RRE, the new machine-learning model.

The foregoing and other described implementations can each, optionally, include one or more of the following features:

A first feature, combinable with any of the following features, comprising storing, as historic data, the role history data and the trace history data in the data lake.

A second feature, combinable with any of the previous or following features, wherein the plurality of persistencies include one or more of user; organization chart, projects, and responsibilities; role; authorization; or software application.

A third feature, combinable with any of the previous or following features, comprising receiving, from the role management application, a request for a new role for a user.

A fourth feature, combinable with any of the previous or following features, comprising forwarding, by the role management application, the request for a new role to the RMS.

A fifth feature, combinable with any of the previous or following features, comprising requesting, by the RMS and to the RRE, a suitable role for the user and a grant recommendation for the suitable role with respect to the user.

A sixth feature, combinable with any of the previous or following features, comprising sending, by the RMS and to a user administrator, a request to assign the suitable role to the user.

In a second implementation, a non-transitory, computer-readable medium storing one or more instructions executable by a computer system to perform operations comprising: receiving, by a role management system (RMS), a request to compute a new machine-learning model for storage in a data lake; reading, by the RMS, role history data from a role management application and trace history data from a trace application; storing metadata read from a plurality of persistencies into the data lake as metadata history; reading, by a role recommendation engine (RRE) integrated into the RMS, historic data and metadata history; and computing, by the RRE, the new machine-learning model.

The foregoing and other described implementations can each, optionally, include one or more of the following features:

A first feature, combinable with any of the following features, comprising storing, as historic data, the role history data and the trace history data in the data lake.

A second feature, combinable with any of the previous or following features, wherein the plurality of persistencies include one or more of user; organization chart, projects, and responsibilities; role; authorization; or software application.

A third feature, combinable with any of the previous or following features, comprising receiving, from the role management application, a request for a new role for a user.

A fourth feature, combinable with any of the previous or following features, comprising forwarding, by the role management application, the request for a new role to the RMS.

A fifth feature, combinable with any of the previous or following features, comprising requesting, by the RMS and to the RRE, a suitable role for the user and a grant recommendation for the suitable role with respect to the user.

A sixth feature, combinable with any of the previous or following features, comprising sending, by the RMS and to a user administrator, a request to assign the suitable role to the user.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, by a role management system (RMS), a request to compute a new machine-learning model for storage in a data lake; reading, by the RMS, role history data from a role management application and trace history data from a trace application; storing metadata read from a plurality of persistencies into the data lake as metadata history; reading, by a role recommendation engine (RRE) integrated into the RMS, historic data and metadata history; and computing, by the RRE, the new machine-learning model.

The foregoing and other described implementations can each, optionally, include one or more of the following features:

A first feature, combinable with any of the following features, comprising storing, as historic data, the role history data and the trace history data in the data lake.

A second feature, combinable with any of the previous or following features, wherein the plurality of persistencies include one or more of user; organization chart, projects, and responsibilities; role; authorization; or software application.

A third feature, combinable with any of the previous or following features, comprising receiving, from the role management application, a request for a new role for a user.

A fourth feature, combinable with any of the previous or following features, comprising forwarding, by the role management application, the request for a new role to the RMS.

A fifth feature, combinable with any of the previous or following features, comprising requesting, by the RMS and to the RRE, a suitable role for the user and a grant recommendation for the suitable role with respect to the user.

A sixth feature, combinable with any of the previous or following features, comprising sending, by the RMS and to a user administrator, a request to assign the suitable role to the user.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, by a role management system (RMS), a request to compute a new machine-learning model for storage in a data lake;
   reading, by the RMS, role history data from a role management application and trace history data from a trace application, wherein the trace application is associated with a software application, and wherein the software application is used by a user consistent with software application authorizations associated with the user;
   storing, by the RMS, metadata read from a plurality of persistencies into the data lake as metadata history;
   reading, by a role recommendation engine (RRE) integrated into the RMS, historic data and the metadata history; and
   computing, by the RRE, the new machine-learning model.

2. The computer-implemented method of claim 1, comprising storing, as the historic data, the role history data and the trace history data in the data lake.

3. The computer-implemented method of claim 1, wherein the plurality of persistencies include one or more of user; organization chart, projects, and responsibilities; role; authorization; or software application.

4. The computer-implemented method of claim 1, comprising receiving, by the RMS and from the role management application, a request for a new role for a user.

5. The computer-implemented method of claim 4, comprising forwarding, by the role management application, the request for a new role to the RMS.

6. The computer-implemented method of claim 5, comprising requesting, by the RMS and to the RRE, a suitable role for the user and a grant recommendation for the suitable role with respect to the user.

7. The computer-implemented method of claim 6, comprising sending, by the RMS and to a user administrator, a request to assign the suitable role to the user.

8. A non-transitory, computer-readable medium storing one or more instructions executable by a computer system to perform operations comprising:
   receiving, by a role management system (RMS), a request to compute a new machine-learning model for storage in a data lake;
   reading, by the RMS, role history data from a role management application and trace history data from a trace application, wherein the trace application is associated with a software application, and wherein the software application is used by a user consistent with software application authorizations associated with the user;
   storing, by the RMS, metadata read from a plurality of persistencies into the data lake as metadata history;

reading, by a role recommendation engine (RRE) integrated into the RMS, historic data and the metadata history; and computing, by the RRE, the new machine-learning model.

9. The non-transitory, computer-readable medium of claim 8, comprising storing, as the historic data, the role history data and the trace history data in the data lake.

10. The non-transitory, computer-readable medium of claim 8, wherein the plurality of persistencies include one or more of user; organization chart, projects, and responsibilities; role; authorization; or software application.

11. The non-transitory, computer-readable medium of claim 8, comprising receiving, by the RMS and from the role management application, a request for a new role for a user.

12. The non-transitory, computer-readable medium of claim 11, comprising forwarding, by the role management application, the request for a new role to the RMS.

13. The non-transitory, computer-readable medium of claim 12, comprising requesting, by the RMS and to the RRE, a suitable role for the user and a grant recommendation for the suitable role with respect to the user.

14. The non-transitory, computer-readable medium of claim 13, comprising sending, by the RMS and to a user administrator, a request to assign the suitable role to the user.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a role management system (RMS), a request to compute a new machine-learning model for storage in a data lake;

reading, by the RMS, role history data from a role management application and trace history data from a trace application, wherein the trace application is associated with a software application, and wherein the software application is used by a user consistent with software application authorizations associated with the user;

storing, by the RMS, metadata read from a plurality of persistencies into the data lake as metadata history;

reading, by a role recommendation engine (RRE) integrated into the RMS, historic data and the metadata history; and computing, by the RRE, the new machine-learning model.

16. The computer-implemented system of claim 15, comprising storing, as the historic data, the role history data and the trace history data in the data lake.

17. The computer-implemented system of claim 15, wherein the plurality of persistencies include one or more of user; organization chart, projects, and responsibilities; role; authorization; or software application.

18. The computer-implemented system of claim 17, comprising receiving, by the RMS and from the role management application, a request for a new role for a user.

19. The computer-implemented system of claim 18 comprising forwarding, by the role management application, the request for a new role to the RMS.

20. The computer-implemented system of claim 19, comprising:
requesting, by the RMS and to the RRE, a suitable role for the user and a grant recommendation for the suitable role with respect to the user; and
sending, by the RMS and to a user administrator, a request to assign the suitable role to the user.

\* \* \* \* \*